(12) United States Patent  
Miyauchi et al.

(10) Patent No.: US 7,160,826 B2
(45) Date of Patent: Jan. 9, 2007

(54) DIELECTRIC PORCELAIN COMPOSITION AND DIELECTRIC RESONATOR USING THE COMPOSITION

(75) Inventors: Yasuharu Miyauchi, Tokyo (JP); Tomohiro Arashi, Tokyo (JP)

(73) Assignee: TDK Corporation, Tokyo (JP)

( * ) Notice: Subject to any disclaimer, the term of this patent is extended or adjusted under 35 U.S.C. 154(b) by 154 days.

(21) Appl. No.: 10/798,355

(22) Filed: Mar. 12, 2004

(65) Prior Publication Data

US 2004/0229745 A1 Nov. 18, 2004

(30) Foreign Application Priority Data

Mar. 17, 2003 (JP) ............................ 2003-071545

(51) Int. Cl.  
*C04B 35/20* (2006.01)  
*C04B 35/465* (2006.01)

(52) U.S. Cl. ...................... 501/136; 501/154
(58) Field of Classification Search ............... 501/136, 501/154  
See application file for complete search history.

(56) References Cited

U.S. PATENT DOCUMENTS

| 4,242,213 | A | 12/1980 | Tamura et al. |
| 5,340,784 | A | 8/1994 | Katoh et al. |
| 5,616,528 | A | 4/1997 | Toda et al. |
| 5,683,790 | A | 11/1997 | Suzuki et al. |
| 5,846,892 | A | 12/1998 | Takada |

FOREIGN PATENT DOCUMENTS

| EP | 0727789 | 8/1996 |
| EP | 1460645 | 9/2004 |
| JP | 61-14605 | 4/1986 |
| JP | 6-56519 | 3/1994 |
| JP | 8-208330 | 8/1996 |
| JP | 2002-193662 | 7/2002 |

OTHER PUBLICATIONS

Patent Abstracts of Japan, vol. 2002, No. 11, Nov. 6, 2002.  
Patent Abstracts of Japan, vol. 1996, No. 12, Dec. 26, 1996.  
Patent Abstracts of Japan, vol. 0182, No. (c-1207), Jun. 2, 1994.  
English Language Abstract of JP 2002-193662.  
"Ceramics Engineering Handbook", edited by Japan Ceramics Society and published by Gihodo, vol. 1, p. 1885,(May 30, 1993).

*Primary Examiner*—David M. Brunsman  
(74) *Attorney, Agent, or Firm*—Greenblum & Bernstein, P.L.C.

(57) ABSTRACT

A dielectric porcelain composition includes $MgTiO_3$ and $Mg_2SiO_4$ and satisfies $a+b=1$ and $0<b<1$, wherein a denotes a molar ratio of $MgTiO_3$ and b denotes a molar ratio of $Mg_2SiO_4$. It can include $MgTiO_3$ and $CaTiO_3$ and satisfy $a+c=1$ and $0<c\leq0.15$, wherein a has the same meaning as shown above and c denotes a molar ratio of $CaTiO_3$. It can also include $MgTiO_3$, $Mg_2SiO_4$ and $CaTiO_3$ and satisfy $a+b+c=1$, $0<b<1$ and $0<c\leq0.15$, wherein a, b and c have the same meanings as shown above. These compositions can be manufactured, with the content of $Mg_2SiO_4$, the content of $CatiO_3$ and the contents of $Mg_2SiO_4$ and $CaTiO_3$ adjusted, respectively. These compositions can be used as dielectric materials to manufacture dielectric resonators.

8 Claims, 11 Drawing Sheets

XRD 0.2275MgTiO$_3$—0.6825Mg$_2$SiO$_4$—0.09CaTiO$_3$

US 7,160,826 B2

DIELECTRIC PORCELAIN COMPOSITION AND DIELECTRIC RESONATOR USING THE COMPOSITION

The present invention relates to a dielectric porcelain composition particularly excellent in characteristics at a millimeter-wave bandwidth region, a dielectric resonator using the composition, and a process for the manufacture of the composition and resonator capable of controlling the characteristics (relative permittivity $\epsilon r$ and temperature coefficient $\tau f$).

DESCRIPTION OF THE PRIOR ART

While various dielectric materials have been known as dielectric materials for high frequency, magnesium titanate-based dielectric materials have been known as one of the materials having a relatively high Qf value. According to "Ceramics Engineering Handbook," edited by Japan Ceramics Society and published by Gihodo, Vol. 1, p. 1885, May 30, 1993, $MgTiO_3$ that is a magnesium titanate-based dielectric material, has relative permittivity $\epsilon r$ of 17, a Qf value of 110000 GHz and temperature dependency of resonance frequency (temperature coefficient $\tau f$) of −45 ppm/K.

In addition, improvements in magnesium titanate-based materials have also been proposed. For example, JP-B SHO 61-14605 discloses a dielectric material obtained by sintering a material containing titanium dioxide and more than 1 mole and not more than 1.3 moles of magnesium oxide per mole of the titanium dioxide. As the characteristics of the dielectric material of the prior art, it is disclosed that the relative permittivity $\epsilon r=17.3$ and no load Qu=12000 (120000 GHz in terms of the Qf value) when $MgO:TiO_2=1.2:1$.

JP-A 2002-193662 discloses dielectric porcelain comprising a first crystal phase of at least one species consisting of $MgTiO_3$, $CaTiO_3$, $Mg_2SiO_4$ and $BaTi_4O_9$, a second crystal phase of at least one species consisting of $Mg_2TiO_4$, $Mg_2B_2O_5$ and $Li_2TiSiO_5$ and oxides of Si, B and Li, with the aim of materializing dielectric porcelain having a high Qf value, with neither flexion nor distortion produced when being calcined together with a conductive material.

Though the technologies in the field of date communications have recently been developed conspicuously, the characteristics required for dielectric materials used for dielectric resonators or other such devices, including the aforementioned Qf value, tend to be diversified due to applications, frequency bandwidths and the like.

In consideration of an application particularly as a resonator material, it is required from a standpoint of ready design to develop dielectric materials having relative permittivity $\epsilon r$ low to a certain extent as one of the characteristics of dielectric materials for submillimeter-wave and millimeter-wave regions. Since the dimension of a resonance phenomenon is directly proportionate to $\epsilon^{-1/2}$ when the dielectric constant is defined as $\epsilon$, when a material having high relative permittivity is used, the dimension of a resonator has to be extremely small with an increasing frequency. In order to make it easy to design a resonator, it is demanded to develop a dielectric material having appropriate relative permittivity $\epsilon r$ taking the entire dimension and workability into consideration.

When the dielectric material is used for a resonator, it is generally noted that the temperature coefficient $\tau f$ is desirably as small as possible. It is further preferable in view of the temperature coefficient of the peripheral parts and other such surrounding parts that the temperature coefficient be set at an optional value to a certain extent.

From these viewpoints, the prior art technologies, such as those disclosed by JP-B SHO 61-14605 and JP-A 2002-193662, for example, pay principal attention to an improvement in the Qf value and Q value, with relative permittivity $\epsilon r$ and temperature coefficient $\tau f$ taken little into consideration.

In the materials available on the market, which have small relative permittivity $\epsilon r$ and small temperature coefficient $\tau f$, the former is about 12.6 and the latter is about −10 ppm/K. These values do not necessarily suffice.

The present invention has been proposed in view of the state of the conventional affairs.

One object of the present invention is to provide a dielectric porcelain composition and a dielectric resonator using the composition, in which the relative permittivity $\epsilon r$ can be adjusted to a relatively small value, and it is made possible to readily design submillimiter-wave resonators and millimeter-wave resonators, for example.

Another object of the present invention is to provide a dielectric porcelain composition and a dielectric resonator using the composition, in which the temperature coefficient $\tau f$ can be made small as much as possible and slightly adjusted in accordance with the surrounding circumstances and the like.

Still another object of the present invention is to provide a dielectric porcelain composition and a dielectric resonator using the composition, in which the relative permittivity $\epsilon r$ has been adjusted to a small value to a certain extent and the temperature coefficient $\tau f$ has been adjusted to the vicinity of zero.

Yet another object of the present invention is to provide a process for optionally adjusting the characteristics (relative permittivity $\epsilon r$ and temperature coefficient $\tau f$) of a dielectric porcelain composition.

The present inventors have keenly continued their studies over a long period of time in order to attain the objects mentioned above. As a result, they have found that addition of $Mg_2SiO_4$ to $MgTiO_3$ enables the relative permittivity $\epsilon r$ to be freely adjusted in accordance with the content of $Mg_2SiO_4$, with the temperature coefficient $\tau f$ varied little, and also to be set optimum in submillimeter-wave or millimeter-wave bandwidth regions and that addition of $CaTiO_3$ to $MgTiO_3$ enables the temperature coefficient $\tau f$ to be set optional in the vicinity of zero in accordance with the content of $CaTiO_3$, with the relative permittivity $\epsilon r$ not so much varied. The present invention has been perfected based on these findings.

According to one aspect of the present invention, a dielectric porcelain composition comprising $MgTiO_3$ and $Mg_2SiO_4$ is characterised in that the composition satisfies a+b=1 and 0<b<1, wherein a denotes a molar ratio of $MgTiO_3$ and b denotes a molar ratio of $Mg_2SiO_4$; a dielectric porcelain composition comprising $MgTiO_3$ and $CaTiO_3$ is characterised in that the composition satisfies a+c=1 and 0<c≦0.15, wherein a denotes a molar ratio $MgTiO_3$ of and c denotes a molar ratio of $CaTiO_3$; or a dielectric porcelain composition comprising $MgTiO_3$, $Mg_2SiO_4$ and $CaTiO_3$ is characterised in that the composition satisfies a+b+c=1, 0<b<1 and 0<c≦0.15, wherein a denotes a molar ratio of $MgTiO_3$, b denotes a molar ratio of $Mg_2SiO_4$ and c denotes a molar ratio of $CaTiO_3$.

In the dielectric porcelain compositions, relative permittivity $\epsilon r$ and temperature coefficient $\tau f$ can be obtained at optional values, respectively, in the range of 6.8 to 18 and in the range of −55 to +55 ppm/K. There can be realized a dielectric porcelain composition having relative permittivity εr in the vicinity of 10 and temperature coefficient τf in the vicinity of zero, for example.

The dielectric porcelain composition can be used as a dielectric material for dielectric resonators, such as submillimeter-wave resonators and millimeter-wave resonators. Therefore, the dielectric resonator of the present invention uses the dielectric porcelain composition as its resonator material.

As described above, the addition of $Mg_2SiO_4$ to $MgTiO_3$ enables the relative permittivity εr to be freely adjusted in accordance with the content of $Mg_2SiO_4$, and the addition of $CaTiO_3$ to $MgTiO_3$ enables the temperature coefficient τf to be set optional in the vicinity of zero in accordance with the content of $CaTiO_3$. In view of these, the adjustment of the contents of these components enables adjustment of the characteristics of a dielectric porcelain composition to be obtained.

According to another aspect of the present invention, there is provided a manufacturing process for the dielectric porcelain composition, which can control the characteristics of the composition. Specifically, the contents of $Mg_2SiO_4$ and $CaTiO_3$ are adjusted respectively within predetermined ranges to adjust the relative permittivity εr and temperature coefficient τf.

BRIEF DESCRIPTION OF THE DRAWINGS

The above and other objects, characteristic features and advantages of the present invention will become apparent to those skilled in the art from the description to be give herein below with reference to the accompanying drawings, in which.

Figure 1:
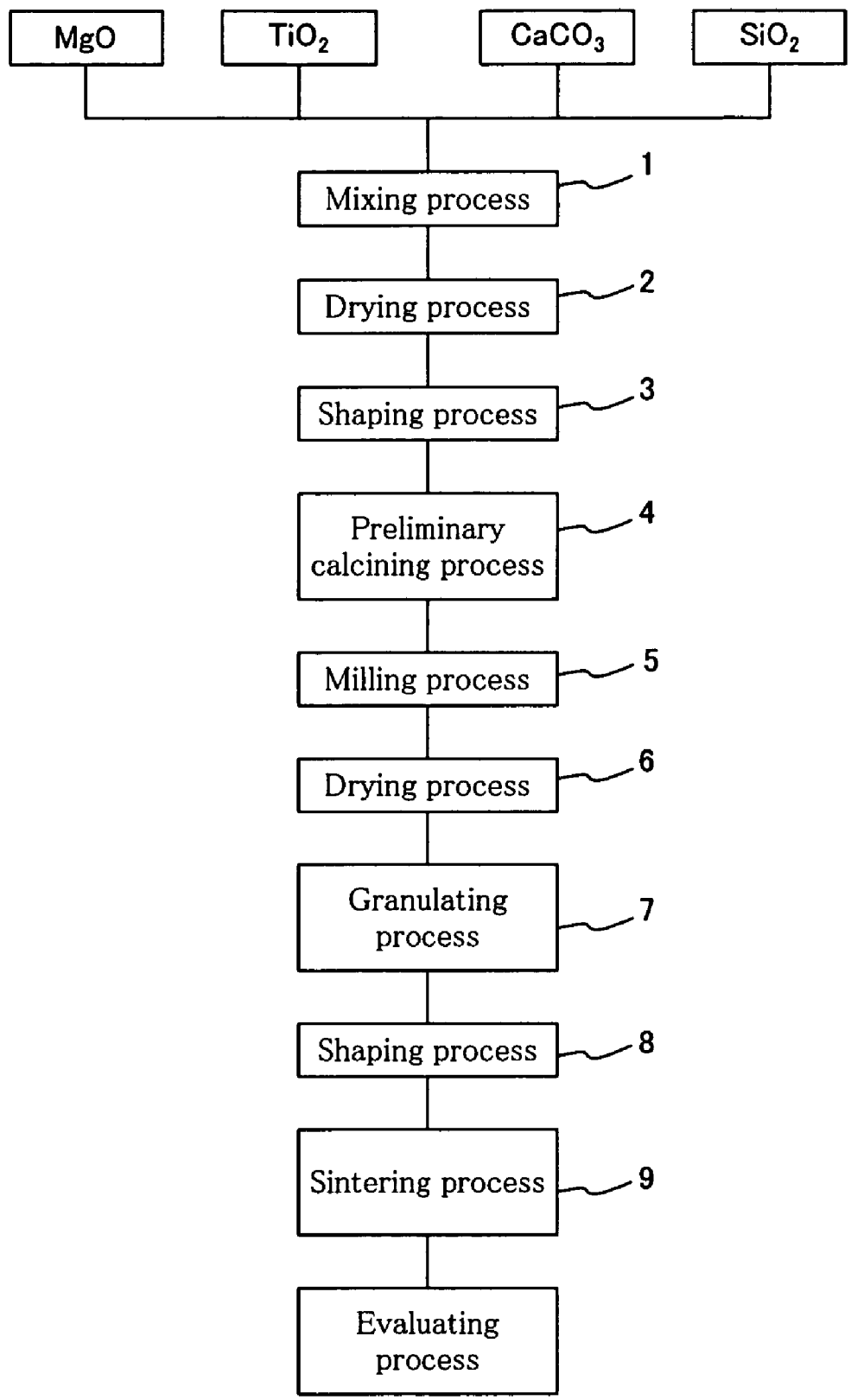
FIG. 1 is a flow chart showing one example of a manufacturing process for a dielectric porcelain composition according to the present invention.

The dielectric porcelain composition, dielectric resonator using the composition and manufacturing process for the composition according to the present invention will be described hereinafter in detail.

The dielectric porcelain composition of the present invention comprises magnesium titanate $MaTiO_3$ added with either one or both of $Mg_2SiO_4$ and $CaTiO_3$.

Though $MaTiO_3$ has excellent characteristics that include a high Qf value, it exhibits slightly high relative permittivity εr of about 18.2 and large temperature coefficient τf of −57 ppm/K. In view of this, added to $MaTiO_3$ in the present invention are $Mg_2SiO_4$ to improve the relative permittivity εr and $CaTiO_3$ to improve the temperature coefficient τf.

When $Mg_2SiO_4$ is added to $MaTiO_3$, the relative permittivity εr decreases substantially in proportion to the content of $Mg_2SiO_4$, whereas the temperature coefficient τf varies little. On the other hand, when $CaTiO_3$ is added to $MaTiO_3$, the temperature coefficient τf shifts gradually from the minus side to the plus side, whereas the relative permittivity εr arises little. For these reasons, the relative permittivity εr and temperature coefficient τf can independently be controlled depending on the contents of $Mg_2SiO_4$ and $CaTiO_3$.

From these standpoints, $Mg_2SiO_4$ or $CaTiO_3$ is added to $MaTiO_3$. It is preferable that the content of $Mg_2SiO_4$ should satisfy that a+b=1 and that 0<b<1, wherein a denotes the molar ratio of $MgTiO_3$ and b denotes the molar ratio of $Mg_2SiO_4$. Controlling the content of $Mg_2SiO_4$ optionally to satisfy these enables the relative permittivity εr to be freely controlled to a value lower than that $MaTiO_3$ has, e.g. in the range of 6.8 to 18. However, when the relative permittivity εr is to be set at a value suitable for use in submillimeter-wave and millimeter-wave regions, e.g. a value of not more than 12, the b is more preferably defined as $0.5 \leq b < 1$.

In the case of $CaTiO_3$ added to $MaTiO_3$, it is preferable that the content thereof should satisfy that a+c=1 and that $0 < c \leq 0.15$, wherein a denotes a molar ratio of $MgTiO_3$ and c denotes a molar ratio of $CaTiO_3$. Controlling the content of $CaTiO_3$ optionally to satisfy these enables the temperature coefficient τf to be freely controlled to a value in the range of −55 to +55 ppm/K. In order to control the temperature coefficient τf to be as close as zero, i.e. around 30 ppm/K, however, the c is more preferably defined as $0.03 \leq c \leq 0.08$.

When both $Mg_2SiO_4$ and $CaTiO_3$ are added to $MaTiO_3$, the contents thereof may be adjusted to respectively suitable amounts to satisfy that a+b+c=1, that 0<b<1 and that $0 < c \leq 0.15$, wherein a denotes a molar ratio of $MgTiO_3$, b denotes a molar ratio of $Mg_2SiO_4$ and c denotes a molar ratio of $CaTiO_3$.

In order to control the relative permittivity εr to be a value suitable for use in submillimeter-wave and millimeter-wave regions, e.g. a value of not more than 12, and the temperature coefficient τf to be as close as zero, the contents of $Mg_2SiO_4$ and $CaTiO_3$ may be adjusted as mentioned above. Though their respective optimum values are slightly different from the defined values, the more preferably ranges are $0.5 \leq b < 1$ and $0.05 \leq c \leq 0.09$, respectively.

It is noted that since it is clear from the X-ray diffraction that the respective components of the dielectric porcelain composition exist respectively in the form of $MgTiO_3$, $Mg_2SiO_4$ and $CatiO_3$ and that the matrix thereof is a crystal phase having the three components combined, the composition is to be represented by their ratios in mol.

Based on the above, by controlling the ratios of the respective components, a dielectric porcelain composition exhibiting the relative permittivity εr of 10.86, temperature coefficient τf of −2.7 ppm/K and Qf value of 74000 GHz can be materialised.

The manufacturing process for the dielectric porcelain composition according to the present invention will be described herein below. The flow chart thereof adopted by the present invention is as shown in FIG. 1.

In the manufacturing process of the present invention, MgO, $TiO_2$, $CaCO_3$ and $SiO_2$ are used as raw materials, for example. While the respective components are mixed in accordance with their respectively desired characteristics, since the prepared composition is reflected substantially as it is by the composition of the dielectric porcelain composition, the raw material components are mixed so that the prepared composition and the composition of the dielectric porcelain composition can have the relationship of 1:1.

The process of manufacturing the dielectric porcelain composition will be described. The raw materials, MgO, $TiO_2$, $CaCO_3$ and $SiO_2$, are mixed at a mixing process 1 to obtain a mixture. The mixture is subjected to a drying process 2 and a shaping process 3 and preliminarily calcined at a calcining process 4. The preliminary calcining is performed in order for the reaction of the raw materials to proceed to a certain extent and generally at a temperature slightly lower than that used in the sintering.

The preliminarily calcined product is milled at a milling process 5 and then dried at a drying process 6. The dried product is granulated at a granulating process 7. In the granulating process, a binder is mingled with the dried product. Though any optional binder can be used, polyvinyl alcohol or the like can advantageously be used, for example.

The granulated product is shaped into a desired shape at a shaping process 8 and sintered at a sintering process 9. The sintering temperature used at the sintering process is adjusted in the range of 1250° C. to 1500° C., for example. The optimum sintering temperature is made slightly different depending on the raw materials for the dielectric porcelain composition. When manufacturing a dielectric porcelain composition comprising $MgTiO_3$ and $Mg_2SiO_4$, the sintering temperature of not less than 1300° C. is preferred. In this case, when the sintering temperature is less than 1300° C., the Qf value will be lowered and the relative density will also be lowered. In the case of a dielectric porcelain composition comprising $MgTiO_3$ and $CaTiO_3$, it is preferable to use the sintering temperature of not less than 1250° C. When it is less than 1250° C., both the Qf value and the relative density are lowered similarly to the case mentioned above. When a dielectric porcelain composition comprising $MgTiO_3$, $Mg_2SiO_4$ and $CaTiO_3$ is to be manufactured, the sintering temperature of not less than 1300° C. is preferable. By setting the sintering temperature within the aforementioned range, the Qf value and relative density can be maintained at high levels, respectively.

In the manufacturing process, MgO, $TiO_2$, $CaCO_3$ and $SiO_2$ are used as the raw materials. However, this is by no means limitative. For example, $MgTiO_3$, $Mg_2SiO_4$ and $CaTiO_3$ can be prepared in advance at their predetermined ratios and used in the manufacturing process.

The dielectric porcelain composition can be used at the frequency bandwidths of submillimeter-waves and millimeter-waves, e.g. 30 to 300 GHz. The frequency bandwidths include that of a radar for automobiles (using the frequency of 77 GHz:38.5 GHz multiplied by 2).

Therefore, the dielectric porcelain composition of the present invention can be used as a material for resonators used in the submillimeter-wave and millimeter-wave regions and a substrate material for MIC dielectrics, and for dielectric waveguides, dielectric antennas, impedance matching of various kinds of millimeter-wave circuits and other such electronic parts. It can suitably be used for dielectric resonators.

The present invention will be described based on concrete experimental results.

Samples of a dielectric porcelain composition were produced in accordance with the following procedure.

MgO, $TiO_2$, $CaCO_3$ and $SiO_2$ were weighed so that these raw materials had a predetermined mixing ratio and then mixed with a ball mill for 16 hours. The mixture obtained was dried at 120° C. for 24 hours and then shaped under a shaping pressure of 200 kgf/cm² into a disc 60 mm in diameter.

The disc was preliminarily calcined at 1100° C. for 2 hours, then milled for 16 hours using the ball mill and dried at 120° C. for 24 hours. The dried product was granulated, with 1% by weight of polyvinyl alcohol added thereto, and shaped under a shaping pressure of 2000 kgf/cm² into a 12 mm-diameter.

Finally, the shaped product was principally calcined to obtain dielectric porcelain composition samples.

In accordance with the process of producing the dielectric porcelain composition samples, $MgTiO_3$ and $Mg_2SiO_4$ used as raw materials were mixed so that b is in the range of 0 to 1, provided that a+b=1, when the molar ratio of $MgTiO_3$ was defined as a and the molar ratio of $Mg_2SiO_4$ was defined as b. The mixture was sintered at a temperature of 1250° C. to 1500° C. to obtain various samples.

Figure 2:
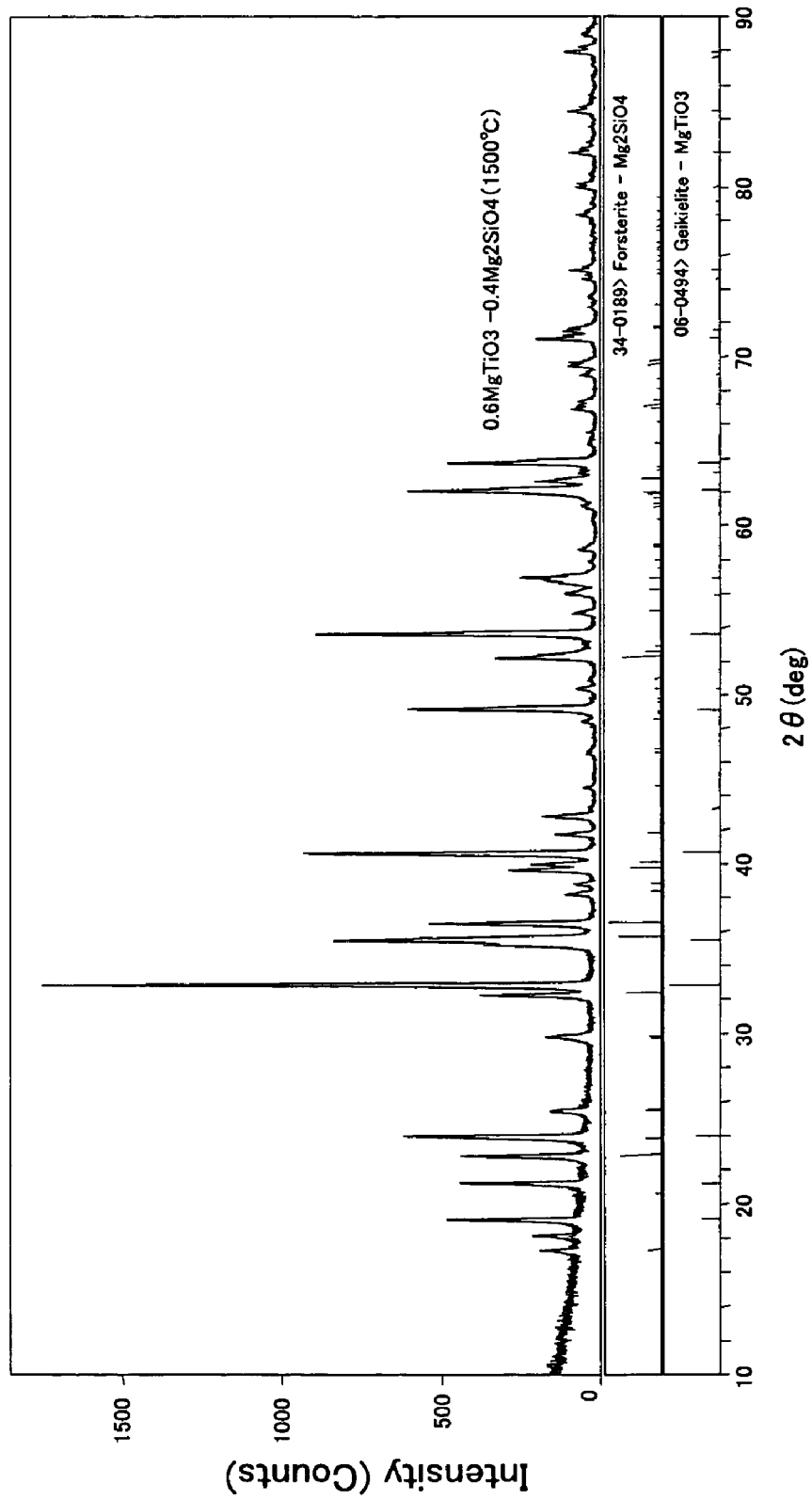
FIG. 2 is an X-ray diffraction chart of $0.6MgTiO_3$-$0.4Mg_2SiO_4$.

A sample of $0.6MgTiO_3$-$0.4Mg_2SiO_4$, wherein a=0.6 and b=0.4, was measured using an X-ray diffraction apparatus. The results of measurement are shown in FIG. 2. It can be observed from the X-ray diffraction chart that there exist peaks resulting respectively from $MgTiO_3$ and $Mg_2SiO_4$, from which it is found that the sample comprises a mixed crystal of $MgTiO_3$ and $Mg_2SiO_4$.

Figure 3:
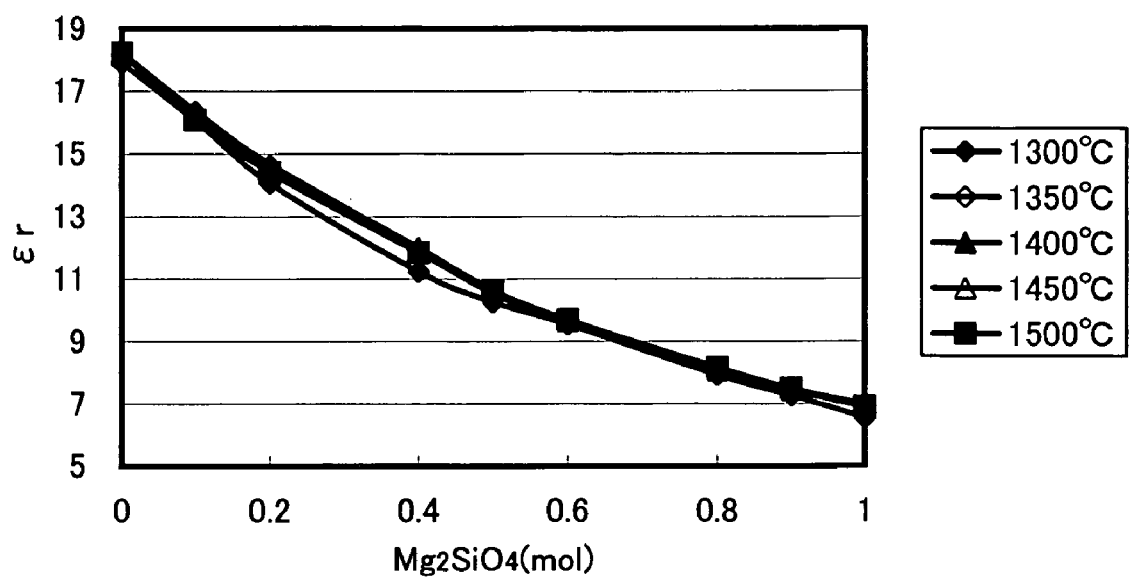
FIG. 3 is a characteristic diagram showing the relationship between $Mg_2SiO_4$ content and the relative permittivity εr in a system of $MgTiO_3$—$Mg_2SiO_4$.
Figure 4:
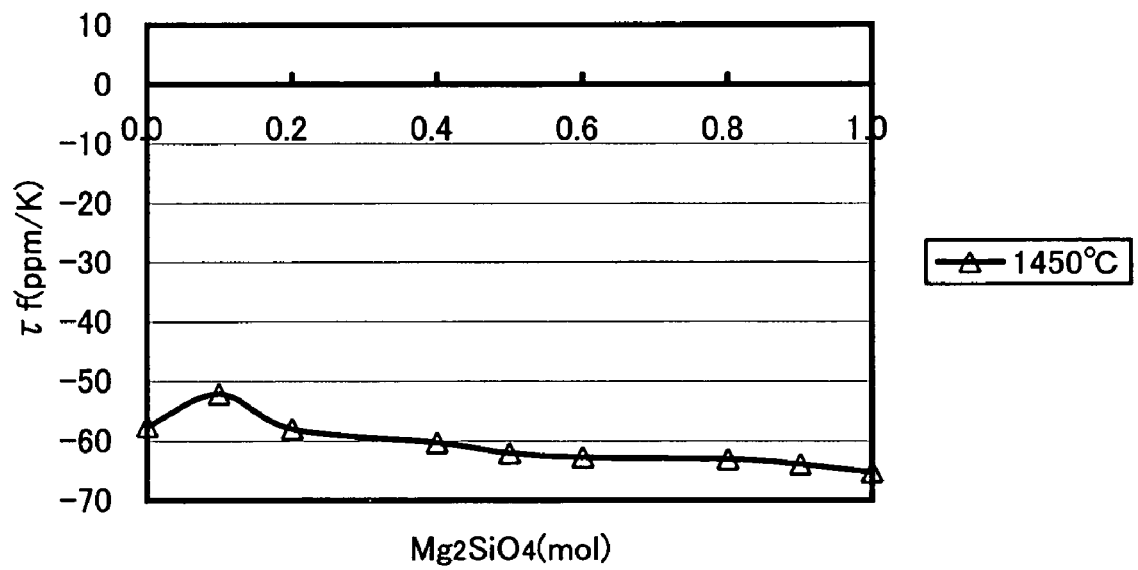
FIG. 4 is a characteristic diagram showing the relationship between $Mg_2SiO_4$ content and the temperature coefficient τf in the $MgTiO_3$—$Mg_2SiO_4$ system.

The relative permittivity εr and temperature coefficient τf of each sample were measured in accordance with the "Method of Testing Dielectric Characteristics of Fine Ceramics for Microwaves" of the Japanese Industrial Standards (JIS R 1627). The results of relative permittivity εr measurement are shown in FIG. 3 and Table 1 below, and the results of temperature coefficient τf measurement are shown in FIG. 4 and Table 2 below.

TABLE 1

| Molar ratio b of $Mg_2SiO_4$ | Relative permittivity εr at 1300° C. | Relative permittivity εr at 1350° C. | Relative permittivity εr at 1400° C. | Relative permittivity εr at 1450° C. | Relative permittivity εr at 1500° C. |
|---|---|---|---|---|---|
| 0.0 | 17.90 | 18.16 | 18.24 | 18.17 | 18.22 |
| 0.1 | 16.05 | 16.33 | 16.36 | 16.24 | 16.07 |
| 0.2 | 14.06 | 14.61 | 14.67 | 14.64 | 14.41 |
| 0.4 | 11.23 | 11.88 | 11.99 | 11.93 | 11.84 |
| 0.5 | 10.25 | 10.53 | 10.64 | 10.63 | 10.62 |
| 0.6 | 9.54 | 9.59 | 9.65 | 9.67 | 9.69 |
| 0.8 | 7.93 | 7.99 | 8.08 | 8.14 | 8.16 |
| 0.9 | 7.26 | 7.41 | 7.45 | 7.47 | 7.49 |
| 1.0 | 6.55 | 6.89 | 6.98 | 6.99 | 6.91 |

TABLE 2

| Molar ratio b of $Mg_2SiO_4$ | Temperature coefficient τf at 1450° C. (ppm/K) |
|---|---|
| 0.0 | −57.6 |
| 0.1 | −52.1 |
| 0.2 | −58.0 |
| 0.4 | −60.3 |
| 0.5 | −62.1 |
| 0.6 | −62.8 |
| 0.8 | −63.1 |
| 0.9 | −64.0 |
| 1.0 | −65.3 |

TABLE 3

| Molar ratio b of $Mg_2SiO_4$ | Relative density (%) at 1300° C. | Relative density (%) at 1350° C. | Relative density (%) at 1400° C. | Relative density (%) at 1450° C. | Relative density (%) at 1500° C. |
|---|---|---|---|---|---|
| 0.0 | 97.5 | 98.4 | 99.0 | 98.7 | 98.6 |
| 0.1 | 97.6 | 98.6 | 98.6 | 98.0 | 97.6 |
| 0.2 | 95.5 | 97.7 | 98.2 | 97.8 | 97.1 |
| 0.4 | 93.5 | 96.9 | 97.4 | 97.3 | 96.8 |
| 0.5 | 92.9 | 96.3 | 97.9 | 97.2 | 97.1 |
| 0.6 | 92.5 | 95.6 | 98.2 | 97.0 | 96.9 |
| 0.8 | 91.5 | 94.8 | 97.6 | 97.0 | 96.9 |
| 0.9 | 90.9 | 94.0 | 97.6 | 96.9 | 97.8 |
| 1.0 | 90.2 | 92.3 | 97.8 | 97.1 | 97.5 |

As is clear from FIG. 3 and Table 1 above, it is found that the relative permittivity εr gradually decreases in proportion as the $Mg_2SiO_4$ content increases. As shown in FIG. 4 and Table 2 above, it is found that the temperature coefficient τf varies little even when the $Mg_2SiO_4$ content varies.

This means that controlling the $Mg_2SiO_4$ content enables the relative permittivity εr to be controlled without affecting the other characteristic (temperature coefficient τf). Particularly when the molar ratio b of $Mg_2SiO_4$ is set to be 0.5 or more, the relative permittivity εr of 12 or less can be materialised.

Figure 5:
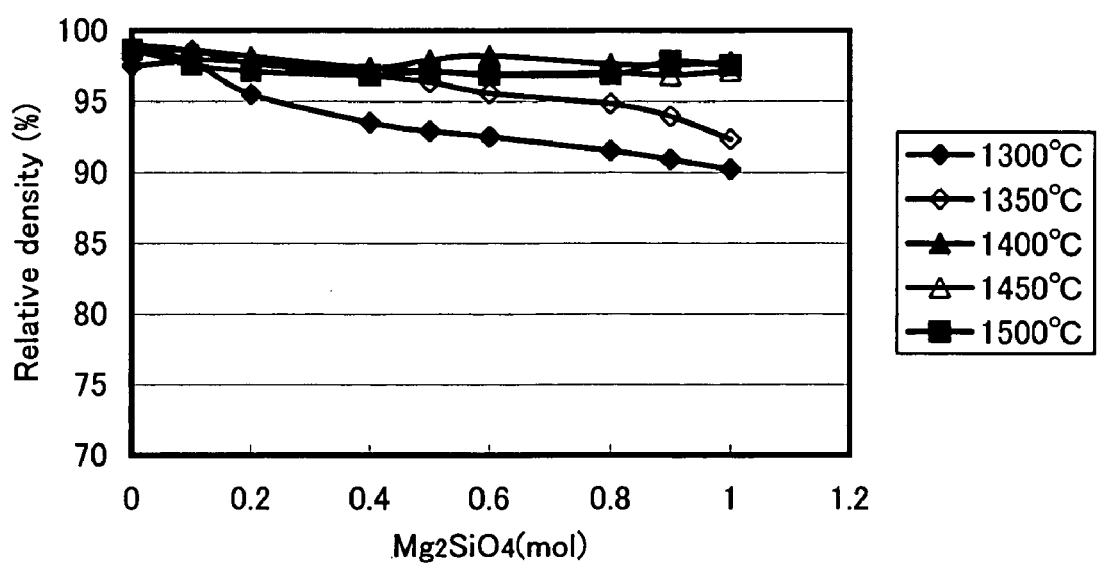
FIG. 5 is a characteristic diagram showing the relationship between the calcining temperature and the relative density in the $MgTiO_3$—$Mg_2SiO_4$ system.

The relative density of each sample produced was also measured. The results of measurement are shown in FIG. 5 and Table 3 below. As is clear from FIG. 5 and Table 3, while the relative density shows a slight drop at 1300° C., it varies little at a temperature of more than 1300° C. Desired relative density could not be obtained when the calcining temperature was 1200° C. or less (not shown). Therefore, when $Mg_2SiO_4$ is used to control the relative permittivity εr, it can be said that the calcining temperature is preferably set to be 1300° C. or more.

In accordance with the process of producing the dielectric porcelain composition samples, $MgTiO_3$ and $CaTiO_3$ used as raw materials were mixed so that c is in the range of 0 to 0.09, provided that a+c=1, when the molar ratio of $MgTiO_3$ was defined as a and the molar ratio of $CaTiO_3$ was defined as c. The mixture was principally calcined at a temperature of 1300° C. to obtain various samples.

Figure 6:
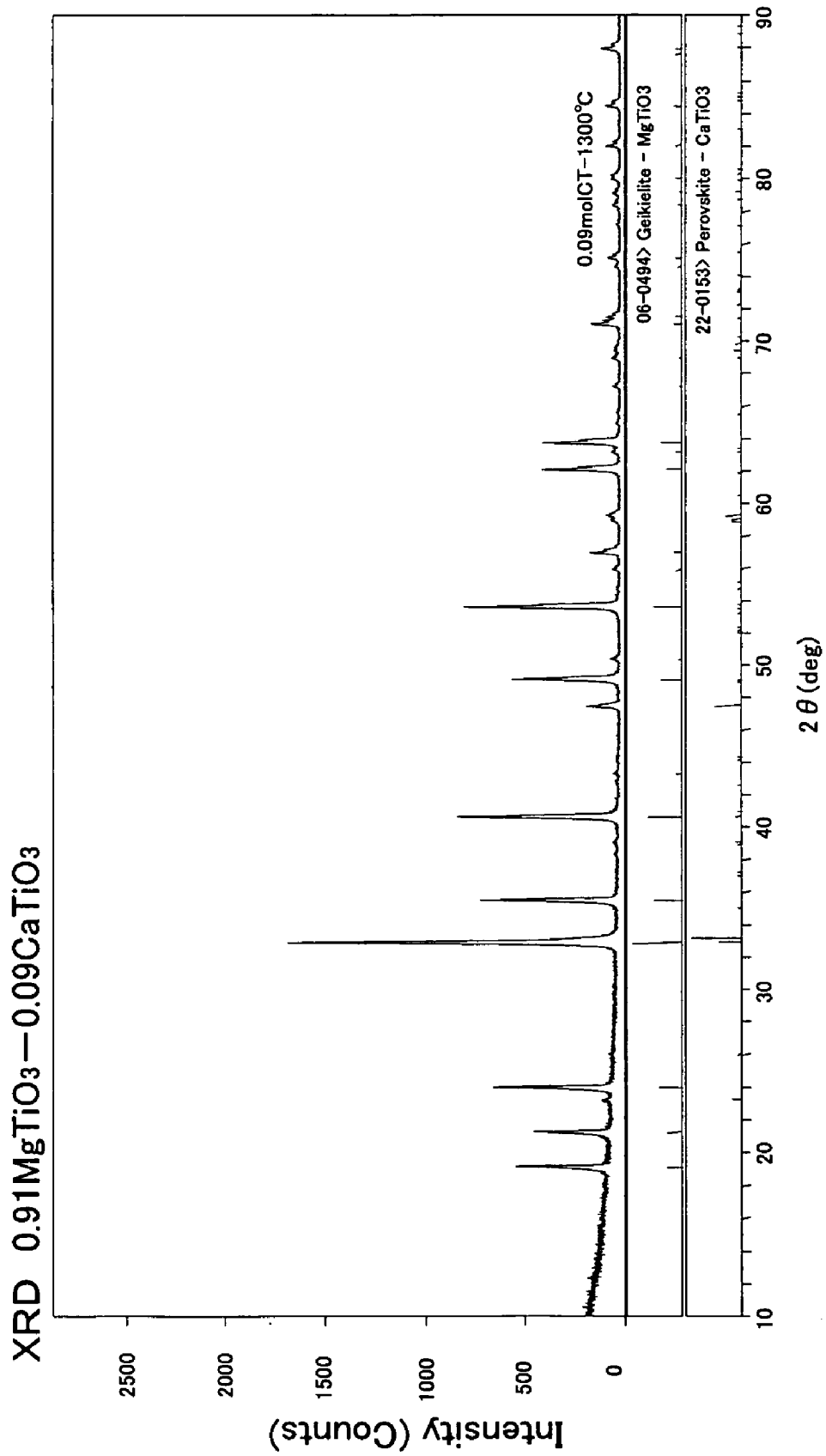
FIG. 6 is an X-ray diffraction chart of $0.91MgTiO_3$-$0.09CaTiO_3$.

In FIG. 6, shown are measurement results of a sample of $0.91MgTiO_3$-$0.09CaTiO_3$, wherein a=0.91 and c=0.09, measured using an X-ray diffraction apparatus. It can be observed from the X-ray diffraction chart that there exist peaks resulting respectively from $MgTiO_3$ and $CaTiO_3$, from which it is found that the sample comprises a mixed crystal of $MgTiO_3$ and $CaTiO_3$.

Figure 7:
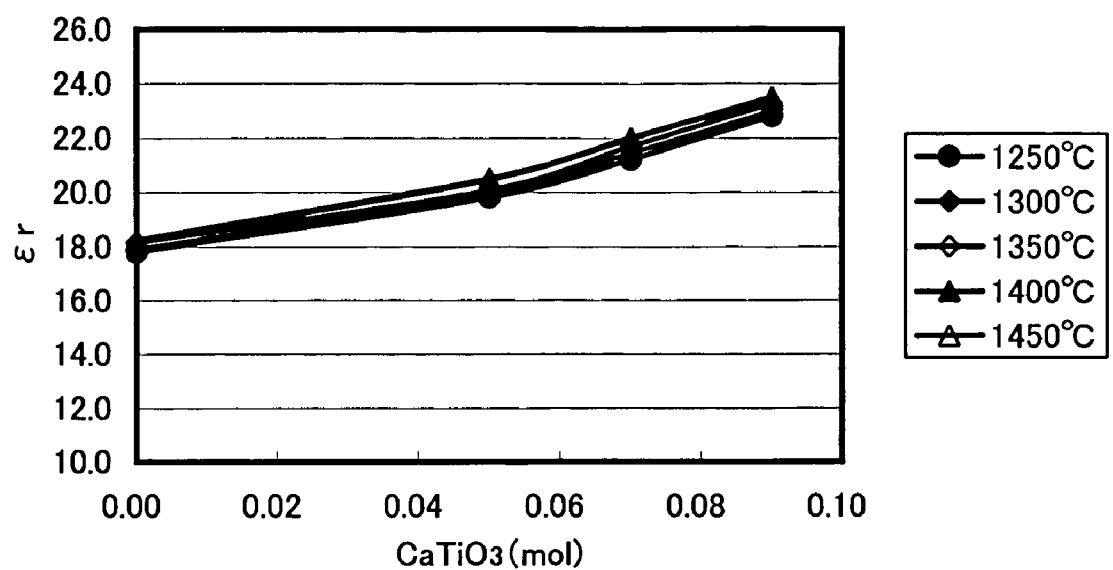
FIG. 7 is a characteristic diagram showing the relationship between $CaTiO_3$ content and the relative permittivity εr in a system of $MgTiO_3$—$CaTiO_3$.
Figure 8:
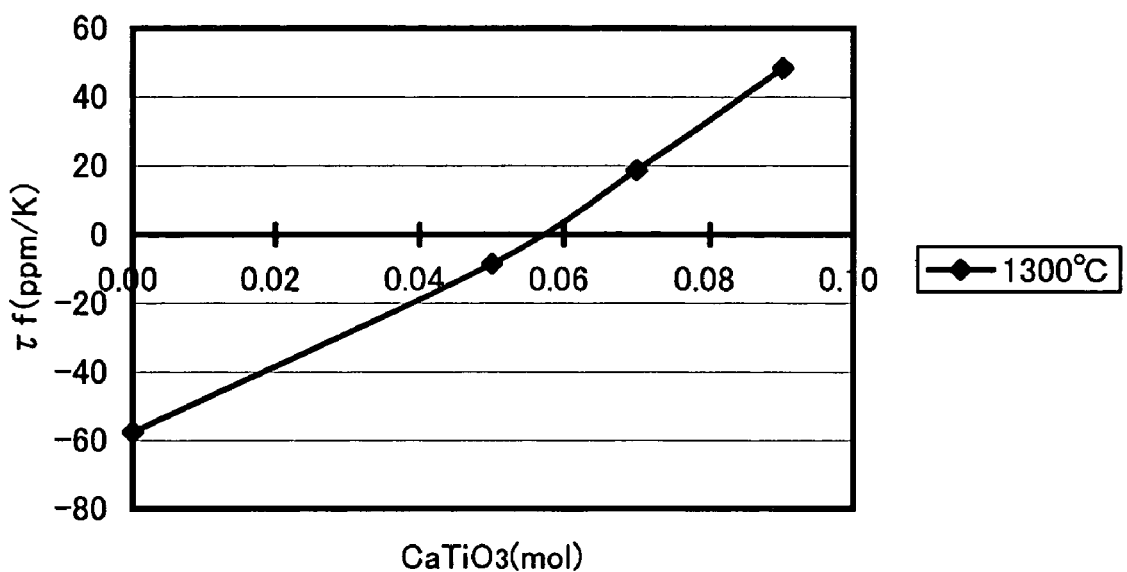
FIG. 8 is a characteristic diagram showing the relationship between $CaTiO_3$ content and the temperature coefficient τf in the $MgTiO_3$—$CaTiO_3$ system.

The relative permittivity εr and temperature coefficient τf of each sample were measured in accordance with the "Method of Testing Dielectric Characteristics of Fine Ceramics for Microwaves" of the Japanese Industrial Standards (JIS R 1627). The results of relative permittivity εr measurement are shown in FIG. 7 and Table 4 below, and the results of temperature coefficient τf measurement are shown in FIG. 8 and Table 5 below.

TABLE 4

| Molar ratio c of $CaTiO_3$ | Relative permittivity εr at 1250° C. | Relative permittivity εr at 1300° C. | Relative permittivity εr at 1350° C. | Relative permittivity εr at 1400° C. | Relative permittivity εr at 1450° C. |
|---|---|---|---|---|---|
| 0.00 | 17.80 | 17.90 | 18.16 | 18.24 | 18.17 |
| 0.05 | 19.80 | 19.94 | 20.08 | 20.51 | 20.47 |
| 0.07 | 21.22 | 21.45 | 21.70 | 21.98 | 22.02 |
| 0.09 | 22.82 | 22.98 | 23.27 | 23.52 | 23.41 |

TABLE 5

| Molar ratio c of $CaTiO_3$ | Temperature coefficient τf at 1300° C. (ppm/K) |
|---|---|
| 0.00 | −57.6 |
| 0.05 | −8.6 |
| 0.07 | 18.7 |
| 0.09 | 48.3 |

As is clear from FIG. 8 and Table 5 above, it is found that the temperature coefficient τf gradually varies in proportion as the $CaTiO_3$ content increases. When the molar ratio c of $CaTiO_3$ is around 0.06, the temperature coefficient τf becomes substantially zero, and shifts to the minus side when the ratio is smaller than 0.06 and to the plus side when the ratio is larger than 006. On the other hand, the relative permittivity εr does not vary so much even when the $CaTiO_3$ content varies, as shown in FIG. 7 and Table 4 above. This means that controlling the $CaTiO_3$ content enables the temperature coefficient if to be independently controlled. Particularly when the molar ratio c of $CaTiO_3$ is set to be in the range of 0.03 to 0.08, the temperature coefficient τf can be controlled in the range of ±30 ppm/K.

Figure 9:
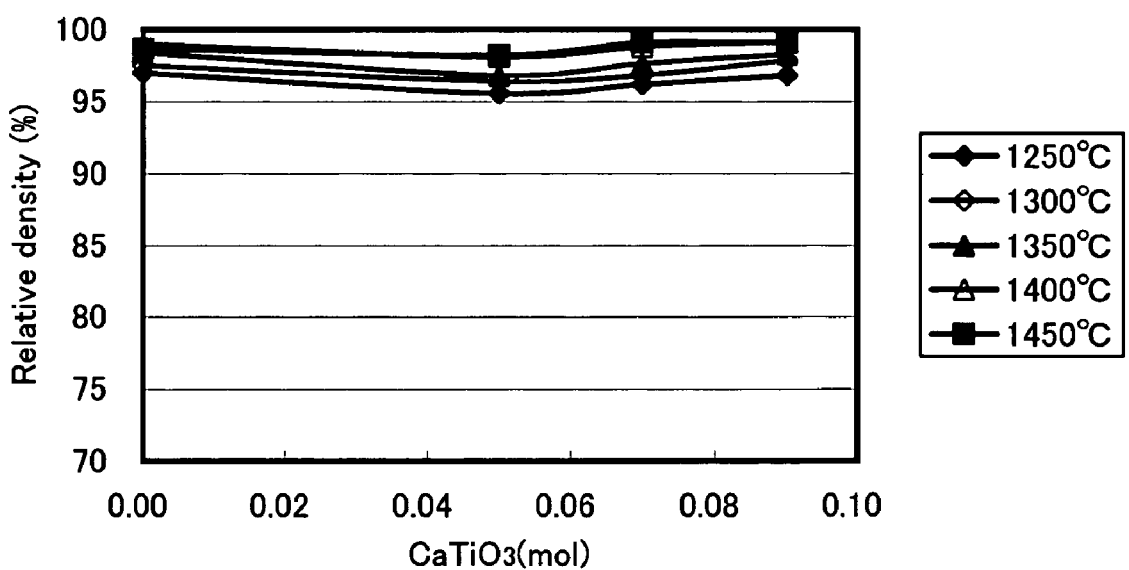
FIG. 9 is a characteristic diagram showing the relationship between the calcining temperature and the relative density in the $MgTiO_3$—$CaTiO_3$ system.

The relative density of each sample produced was also measured. The results of measurement are shown in FIG. 9 and Table 6 below. As is clear from FIG. 9 and Table 6, the relative density shows a level not giving rise to any problem when the temperature is 1250° C. or more. Therefore, when $CaTiO_3$ is used to control the temperature coefficient τf, it can be said that the calcining temperature is preferably set to be 1250° C. or more.

TABLE 6

| Molar ratio c of $CaTiO_3$ | Relative density (%) at 1250° C. | Relative density (%) at 1300° C. | Relative density (%) at 1350° C. | Relative density (%) at 1400° C. | Relative density (%) at 1450° C. |
|---|---|---|---|---|---|
| 0.00 | 97.0 | 97.5 | 98.4 | 99.0 | 98.7 |
| 0.05 | 95.6 | 96.4 | 96.8 | 98.1 | 98.2 |
| 0.07 | 96.2 | 96.8 | 97.7 | 98.8 | 99.1 |
| 0.09 | 96.8 | 97.9 | 98.3 | 99.2 | 99.1 |

In accordance with the process of producing the dielectric porcelain composition samples, samples each comprising $MgTiO_3$, $Mg_2SiO_4$ and $CaTiO_3$ were produced.

Figure 10:
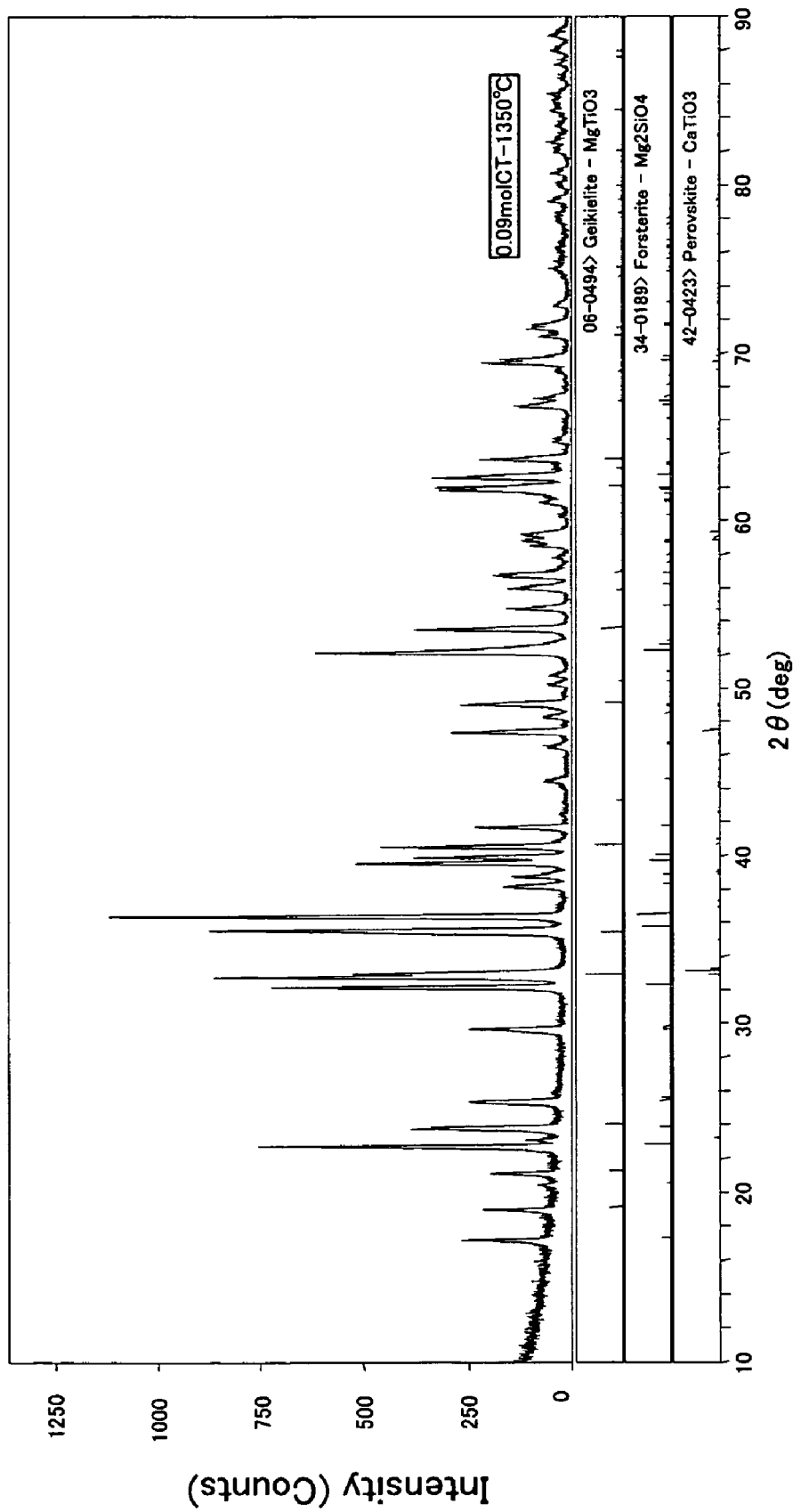
FIG. 10 is an X-ray diffraction chart of $0.2275MgTiO_3$-$0.6825Mg_2SiO_4$-$0.09CaTiO_3$.

FIG. 10 shows measurement results of a sample of $0.2275MgTiO_3$-$0.6825Mg_2SiO_4$-$0.09CaTiO_3$, wherein a=0.2275, b=0.6825 and c=0.09, measured using an X-ray diffraction apparatus. It can be observed from the X-ray diffraction chart that there exist peaks resulting respectively from $MgTiO_3$, $Mg_2SiO_4$ and $CaTiO_3$, from which it is found that the sample comprises a mixed crystal of $MgTiO_3$, $Mg_2SiO_4$ and $CaTiO_3$.

Figure 11:
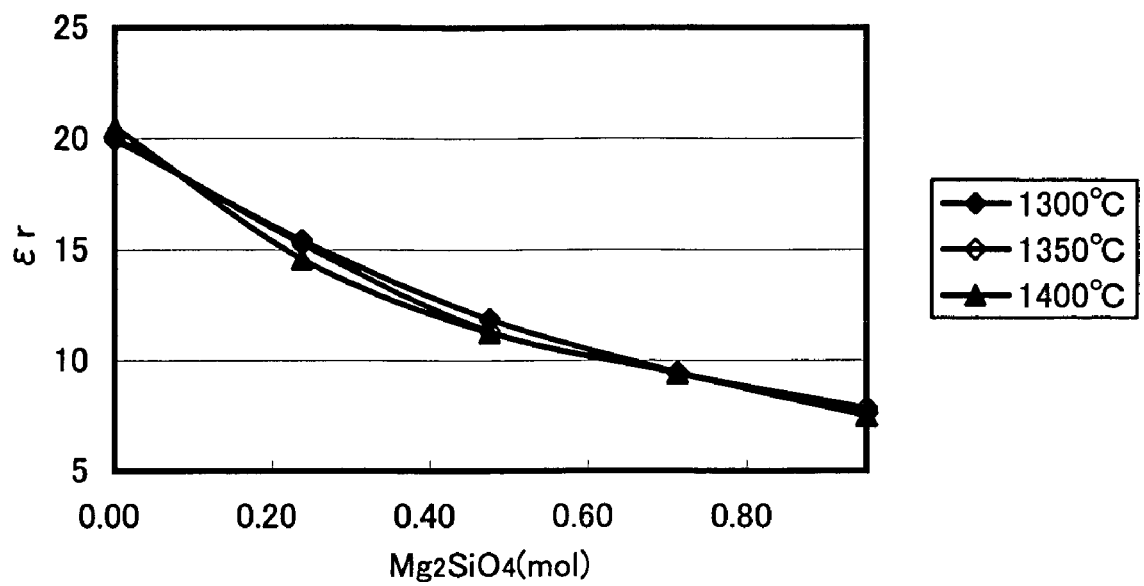
FIG. 11 is a characteristic diagram showing the results of relative permittivity εr measured in a system of $MgTiO_3$—$Mg_2SiO_4$—$CaTiO_3$, with 0.05 mol of $CaTiO_3$ fixed and with the $Mg_2SiO_4$ substitution amount varied.
Figure 12:
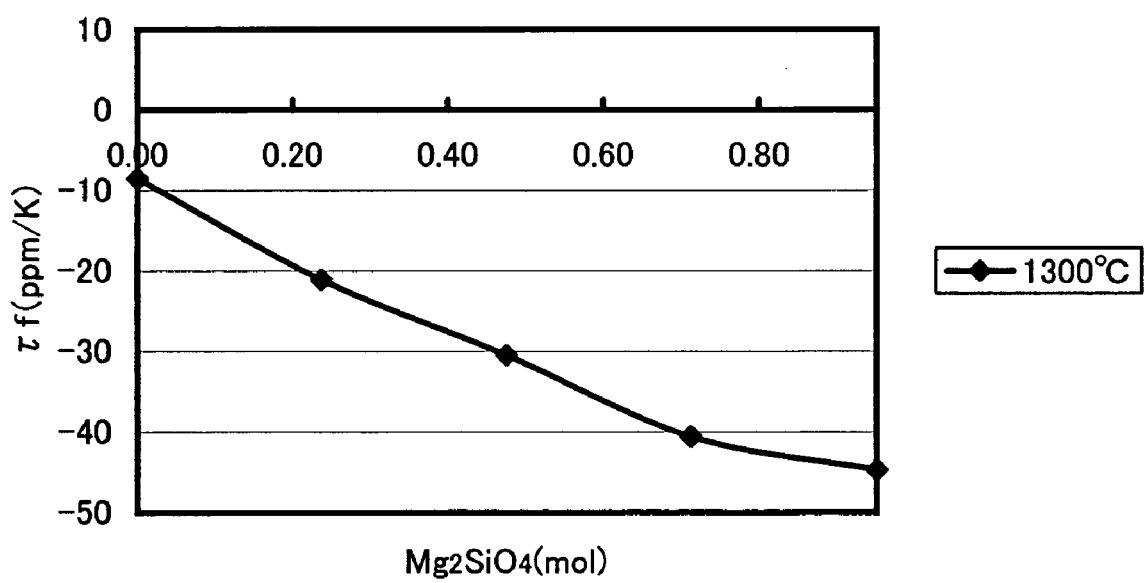
FIG. 12 is a characteristic diagram showing the results of temperature coefficient τf measured in the $MgTiO_3$—$Mg_2SiO_4$—$CaTiO_3$ system, with 0.05 mol of $CaTiO_3$ fixed and with the $Mg_2SiO_4$ substitution amount varied.

In a system of $MgTiO_3$—$Mg_2SiO_4$—$CaTiO_3$, various samples were prepared, with 0.05 mol of $CaTiO_3$ fixed (c=0.05) and with the $Mg_2SiO_4$ substitution amount varied. In this case, the results of relative permittivity εr measured are shown in FIG. 11 and Table 7 below, the results of temperature coefficient τf measured in FIG. 12 and Table 8 below, and the relative density measured in FIG. 13 and Table 9 below.

TABLE 7

| Molar ratio b of $Mg_2SiO_4$ | Relative permittivity εr at 1300° C. | Relative permittivity εr at 1350° C. | Relative permittivity εr at 1400° C. |
|---|---|---|---|
| 0.0000 | 19.94 | 20.08 | 20.51 |
| 0.2375 | 15.41 | 15.24 | 14.57 |
| 0.4750 | 11.85 | 11.31 | 11.25 |
| 0.7125 | 9.46 | 9.42 | 9.43 |
| 0.9500 | 7.60 | 7.83 | 7.48 |

TABLE 8

| Molar ratio b of $Mg_2SiO_4$ | Temperature coefficient τf at 1300° C. (ppm/K) |
|---|---|
| 0.0000 | −8.6 |
| 0.2375 | −21.1 |
| 0.4750 | −30.5 |
| 0.7125 | −40.6 |
| 0.9500 | −44.7 |

TABLE 9

| Molar ratio b of $Mg_2SiO_4$ | Relative density (%) at 1300° C. | Relative density (%) at 1350° C. | Relative density (%) at 1400° C. |
|---|---|---|---|
| 0.0000 | 96.4 | 96.8 | 98.1 |
| 0.2375 | 96.9 | 96.7 | 94.7 |
| 0.4750 | 96.2 | 93.8 | 92.3 |
| 0.7125 | 97.1 | 96.0 | 95.9 |
| 0.9500 | 96.1 | 98.3 | 96.5 |

Figure 14:
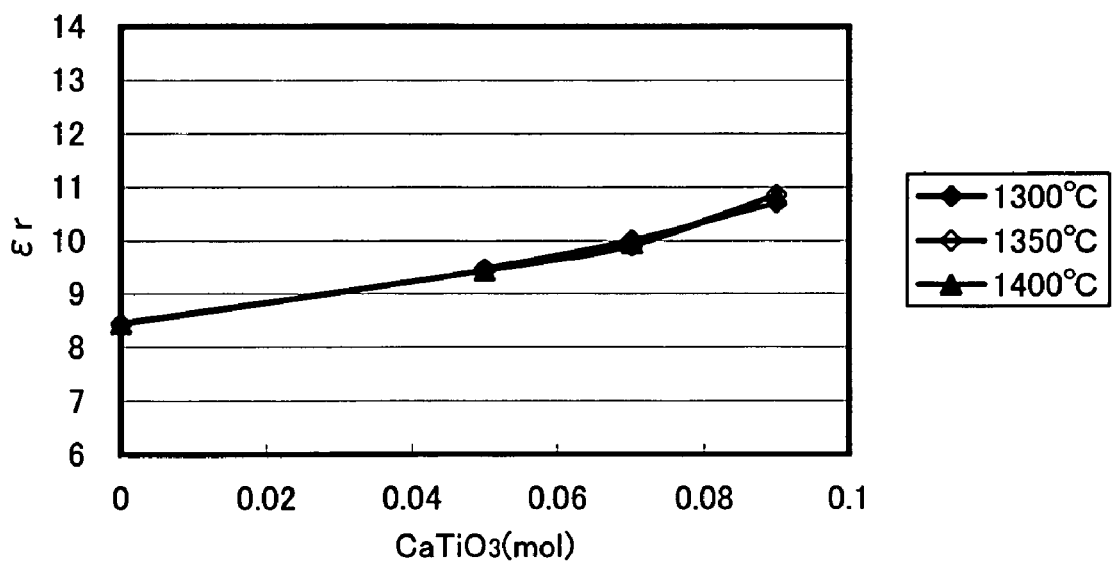
FIG. 14 is a characteristic diagram showing the results of relative permittivity εr measured in a system of $MgTiO_3$—$Mg_2SiO_4$—$CaTiO_3$, with $MgTiO_3$:$Mg_2SiO_4$ fixed to 1:3 and with the $CaTiO_3$ substitution amount varied.
Figure 15:
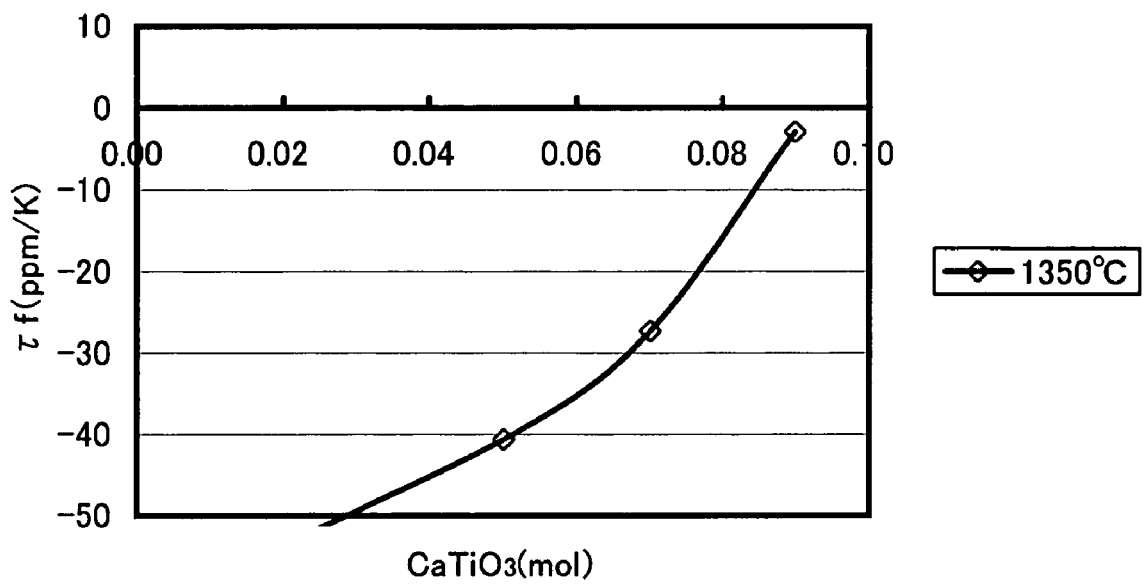
FIG. 15 is a characteristic diagram showing the results of temperature coefficient τf measured in the $MgTiO_3$—$Mg_2SiO_4$—$CaTiO_3$ system, with $MgTiO_3$:$Mg_2SiO_4$ fixed to 1:3 and with the $CaTiO_3$ substitution amount varied.

In the $MgTiO_3$—$Mg_2SiO_4$—$CaTiO_3$ system, various samples were produced, with $MgTiO_3$:$Mg_2SiO_4$ fixed to 1:3 and with the $CaTiO_3$ substitution amount varied. In this case, the results of relative permittivity εr measured are shown in FIG. 14 and Table 10 below, the results of temperature coefficient τf measured in FIG. 15 and Table 11 below, and the relative density measured in FIG. 16 and Table 12 below.

TABLE 10

| Molar ratio c of $CaTiO_3$ | Relative permittivity εr at 1300° C. | Relative permittivity εr at 1350° C. | Relative permittivity εr at 1400° C. |
|---|---|---|---|
| 0.00 |  | 8.43 | 8.45 |
| 0.05 | 9.46 | 9.42 | 9.43 |
| 0.07 | 10.01 | 9.91 | 9.95 |
| 0.09 | 10.70 | 10.86 | 10.84 |

TABLE 11

| Molar ratio c of $CaTiO_3$ | Temperature coefficient τf at 1350° C. (ppm/K) |
|---|---|
| 0.00 | −62.0 |
| 0.05 | −40.6 |
| 0.07 | −27.3 |
| 0.09 | −2.9 |

TABLE 12

| Molar ratio c of $CaTiO_3$ | Relative density (%) at 1300° C. | Relative density (%) at 1350° C. | Relative density (%) at 1400° C. |
|---|---|---|---|
| 0.00 |  | 95.8 | 96.7 |
| 0.05 | 97.1 | 96.0 | 95.9 |

TABLE 12-continued

| Molar ratio c of $CaTiO_3$ | Relative density (%) at 1300° C. | Relative density (%) at 1350° C. | Relative density (%) at 1400° C. |
| --- | --- | --- | --- |
| 0.07 | 96.5 | 95.8 | 95.6 |
| 0.09 | 95.5 | 97.4 | 96.6 |

As is clear from these Figures and Tables, also in the three-element system, it is possible to control the relative permittivity εr through adjustment of the $Mg_2SiO_4$ content and control the temperature coefficient τf through adjustment of the $CaTiO_3$ content. In the composition of $0.2275MgTiO_3$-$0.6825Mg_2SiO_4$-$0.09CaTiO_3$ prepared with the aim that the relative permittivity εr=10 and that the temperature coefficient τf=0, it was found that the relative permittivity εr=10.86 and that the temperature coefficient τf=−2.7 ppm/K.

Figure 13:
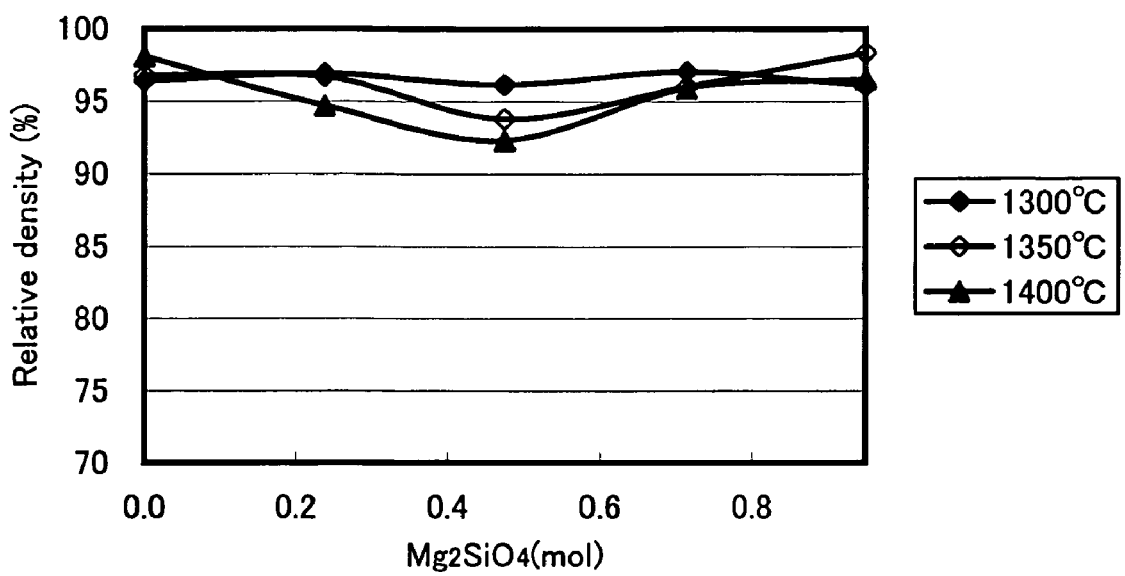
FIG. 13 is a characteristic diagram showing the results of relative density measured in the $MgTiO_3$—$Mg_2SiO_4$—$CaTiO_3$ system, with 0.05 mol of $CaTiO_3$ fixed and with the $Mg_2SiO_4$ substitution amount varied.
Figure 16:
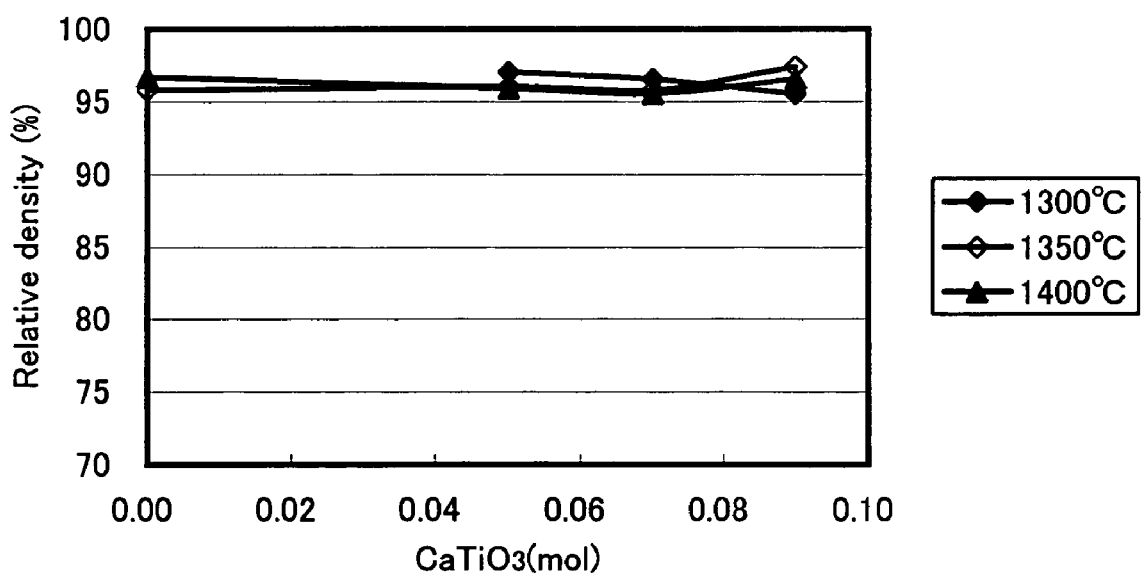
FIG. 16 is a characteristic diagram showing the results of relative density measured in the $MgTiO_3$—$Mg_2SiO_4$—$CaTiO_3$ system, with $MgTiO_3$:$Mg_2SiO_4$ fixed to 1:3 and with the $CaTiO_3$ substitution amount varied.

In addition, upon considering the relative density of each sample produced, it was found from FIGS. 13 and 16 and Tables 9 and 12 that good results could be obtained when the calcining temperature was 1300° C. or more.

As is clear from the foregoing description, according to the present invention, the relative permittivity εr and temperature coefficient τf can be controlled to enable provision of a dielectric porcelain composition with the relative permittivity εr suitable for submillimeter-wave and millimeter-wave regions and the temperatue coefficient τf controlled to a value in the vicinity of 0.

Also according to the present invention, using the dielectric porcelain composition as a dielectric material enables provision of a dielectric resonator usable in the submillimeter-wave and millimeter-wave bandwidth regions. In the dielectric resonator, since the dielectric porcelain composition exhibits appropriate relative permittivity εr, the dimensional tolerance can be alleviated to make it easy to design a dielectric resonator when being fabricated. Furthermore, the temperature coefficient can also be controlled in compliance with the temperature coefficient of the surrounding parts and the like.

The present disclosure relates to subject matter contained in Japanese Patent Application Nos. 2003-071545, filed on Mar. 17, 2003, the contents of which are herein expressly incorporated by reference in its entirety.

The invention claimed is:

1. A dielectric porcelain composition calcined at a temperature of not less than 1300° C. comprising $MgTiO_3$, $Mg_2SiO_4$ and $CaTiO_3$ and satisfying a+b+c=1, 0<b<1 and 0<c≦0.15, wherein a denotes a molar ratio of $MgTiO_3$, b denotes a molar ratio of $Mg_2SiO_4$ and c denotes a molar ratio of $CaTiO_3$.

2. The composition according to claim 1, wherein the molar ratio b is defined as 0.5≦b<1 and the molar ratio c is defined as 0.05≦c≦0.09.

3. A dielectric resonator comprising as a dielectric material a dielectric porcelain composition calcined at a temperature of not less than 1300° C. that comprises $MgTiO_3$, $Mg_2SiO_4$ and $CaTiO_3$ and satisfies a+b+c=1, 0≦b≦1 and 0<c≦0.15, wherein a denotes a molar ratio of $MgTiO_3$, b denotes a molar ratio of $Mg_2SiO_4$ and c denotes a molar ratio of $CaTiO_3$.

4. A manufacturing process for a dielectric porcelain composition that comprises $MgTiO_3$, $Mg_2SiO_4$ and $CaTiO_3$, comprising adjusting respective contents of $Mg_2SiO_4$ and $CaTiO_3$ to satisfy a+b+c=1, 0<b<1 and 0<c≦0.15, wherein a denotes a molar ratio of $MgTiO_3$, b denotes a molar ratio of $Mg_2SiO_4$ and c denotes a molar ratio of $CaTiO_3$, thereby adjusting relative permittivity εr and temperature coefficient τf, and calcining these materials at a temperature of not less than 1300° C.

5. A dielectric porcelain composition consisting of $MgTiO_3$, $Mg_2SiO_4$ and $CaTiO_3$ and satisfying a+b+c=1, 0<b<1 and 0<c≦0.15, wherein a denotes a molar ratio of $MgTiO_3$, b denotes a molar ratio of $Mg_2SiO_4$ and c denotes a molar ratio of $CaTiO_3$.

6. The composition according to claim 5, wherein the molar ratio b is defined as 0.5 b<1 and the molar ratio c is defined as 0.05≦c≦0.09.

7. A dielectric resonator comprising as a dielectric material a dielectric porcelain composition consisting of $MgTiO_3$, $Mg_2SiO_4$ and $CaTiO_3$ and satisfies a+b+c=1, 0<b≦1 and 0<c≦0.15, wherein a denotes a molar ratio of $MgTiO_3$, b denotes a molar ratio of $Mg_2SiO_4$ and c denotes a molar ratio of $CaTiO_3$.

8. A manufacturing process for a dielectric porcelain composition consisting of $MgTiO_3$, $Mg_2SiO_4$ and $CaTiO_3$, comprising adjusting respective contents of $Mg_2SiO_4$ and $CaTiO_3$ to satisfy a+b+c=1, 0<b<1 and 0<c≦0.15, wherein a denotes a molar ratio of $MgTiO_3$, b denotes a molar ratio of $Mg_2SiO_4$ and c denotes a molar ratio of $CaTiO_3$, thereby adjusting relative permittivity εr and temperature coefficient τf.

* * * * *

UNITED STATES PATENT AND TRADEMARK OFFICE
CERTIFICATE OF CORRECTION

| | |
|---|---|
| PATENT NO. | : 7,160,826 B2 |
| APPLICATION NO. | : 10/798355 |
| DATED | : January 9, 2007 |
| INVENTOR(S) | : Miyauchi et al. |

It is certified that error appears in the above-identified patent and that said Letters Patent is hereby corrected as shown below:

At column 12, line 11 of the printed patent, "$0 \leq b \leq 1$" should be --$0 < b < 1$--.

At column 12, line 31 of the printed patent, "$0.5\ b < 1$" should be --$0.5 \leq b < 1$--.

At column 12, line 36 of the printed patent, "$0 < b \leq 1$" should be --$0 < b < 1$--.

Signed and Sealed this

Eighteenth Day of December, 2007

JON W. DUDAS
*Director of the United States Patent and Trademark Office*